United States Patent
Hemingway et al.

(10) Patent No.: US 6,835,358 B2
(45) Date of Patent: Dec. 28, 2004

(54) NON-THERMAL PLASMA REACTOR FOR LOWER POWER CONSUMPTION

(75) Inventors: Mark David Hemingway, Colombiaville, MI (US); Thomas Roger Thoreson, Brighton, MI (US); David Alexander Goulette, Marine City, MI (US); Joachim Kupe, Davisburg, MI (US)

(73) Assignee: Delphi Technologies, Inc., Troy, MI (US)

( * ) Notice: Subject to any disclaimer, the term of this patent is extended or adjusted under 35 U.S.C. 154(b) by 314 days.

(21) Appl. No.: 10/146,738

(22) Filed: May 16, 2002

(65) Prior Publication Data

US 2002/0134666 A1 Sep. 26, 2002

Related U.S. Application Data

(63) Continuation-in-part of application No. 09/741,782, filed on Dec. 19, 2000, now Pat. No. 6,482,368.

(51) Int. Cl.$^7$ .............................................. B01J 19/08
(52) U.S. Cl. ..................... 422/186.04; 60/275; 204/177
(58) Field of Search ...................... 422/186.04; 60/275; 204/177

(56) References Cited

U.S. PATENT DOCUMENTS

| | | |
|---|---|---|
| 6,338,827 B1 | 1/2002 | Nelson et al. |
| 6,354,903 B1 | 3/2002 | Nelson |
| 6,368,451 B1 | 4/2002 | Goulette et al. |
| 6,423,190 B2 | 7/2002 | Hemingway et al. |
| 6,464,945 B1 | 10/2002 | Hemingway |
| 6,482,368 B2 | 11/2002 | Hemingway et al. |
| 6,537,507 B2 | 3/2003 | Nelson et al. |
| 6,638,484 B2 | 10/2003 | Nelson et al. |

FOREIGN PATENT DOCUMENTS

| | | |
|---|---|---|
| WO | 9102581 | 3/1991 |
| WO | 9926726 | 6/1999 |
| WO | 9947242 | 9/1999 |

*Primary Examiner*—Kishor Mayekar
(74) *Attorney, Agent, or Firm*—Paul L. Marshall

(57) ABSTRACT

A system and method for treating a combustion exhaust stream includes admitting an exhaust stream into a non-thermal plasma reactor having at least one segmented non-thermal plasma element including a plurality of individually energizable electrode segments defining a plurality of corona volumes. In a preferred embodiment, the electrode segments are progressively smaller in size in the exhaust flow direction to provide optimum plasma volume variation. Individually energizable electrodes are selectively activated to effect variable corona volumes for treating an exhaust stream. Additional reactor segments are activated only as needed, such as during periods of high exhaust flow, for efficient treatment of the exhaust stream so as to maintain optimized high space velocity in the active corona volume. The segmented elements may comprise a variety of shapes. The system and method are particularly suitable for gas pretreatment and downstream diesel particulate filter regeneration.

35 Claims, 2 Drawing Sheets

NON-THERMAL PLASMA REACTOR FOR LOWER POWER CONSUMPTION

CROSS-REFERENCE TO RELATED APPLICATIONS

The present application is a continuation-in-part of U.S. patent application Ser. No. 09/741,782, now U.S. Pat. No. 6,482,368 of Mark D. Hemingway, et al., filed Dec. 19, 2000, entitled "Non-thermal Plasma Reactor For Lower Power Consumption," which is hereby incorporated by reference herein in its entirety.

TECHNICAL FIELD

The present invention relates to non-thermal plasma reactors and more particularly relates to non-thermal plasma reactors and methods for decomposing hazardous compounds in liquids or gases, such as particulate emissions in diesel engine exhaust streams, with reduced power consumption.

BACKGROUND OF THE INVENTION

Certain compounds in the exhaust stream of a combustion process, such as the exhaust stream from an internal combustion engine, are undesirable in that they must be controlled in order to meet government emissions regulations. Among the regulated compounds are hydrocarbons, soot particulates, and nitrogen oxide compounds (NOx). There are a wide variety of combustion processes producing these emissions, for instance, coal- or oil-fired furnaces, reciprocating internal combustion engines (including gasoline spark ignition and diesel engines), gas turbine engines, and so on. In each of these combustion processes, control measures to prevent or diminish atmospheric emissions of these emissions are needed.

Industry has devoted considerable effort to reducing regulated emissions from the exhaust streams of combustion processes. In particular, it is now usual in the automotive industry to place a catalytic converter in the exhaust system of gasoline spark ignition engines to remove undesirable emissions from the exhaust by chemical treatment. Typically, a "three-way" catalyst system of platinum, palladium, and rhodium metals dispersed on an oxide support is used to oxidize carbon monoxide and hydrocarbons to water and carbon dioxide and to reduce nitrogen oxides to nitrogen. The catalyst system is applied to a ceramic substrate such as beads, pellets, or a monolith. When used, beads are usually porous, ceramic spheres having the catalyst metals impregnated in an outer shell. The beads or pellets are of a suitable size and number in the catalytic converter in order to place an aggregate surface area in contact with the exhaust stream that is sufficient to treat the compounds of interest. When a monolith is used, it is usually a cordierite honeycomb monolith and may be pre-coated with gamma-alumina and other specialty oxide materials to provide a durable, high surface area support phase for catalyst deposition. The honeycomb shape, used with the parallel channels running in the direction of the flow of the exhaust stream, both increases the surface area exposed to the exhaust stream and allows the exhaust stream to pass through the catalytic converter without creating undue back pressure that would interfere with operation of the engine.

When a spark ignition engine is operating under stoichiometric conditions or nearly stoichiometric conditions with respect to the fuel-air ratio (just enough oxygen to completely combust the fuel, or perhaps up to 0.3% excess oxygen), a "three-way" catalyst has proven satisfactory for reducing emissions. Unburned fuel (hydrocarbons) and oxygen are consumed in the catalytic converter, and the relatively small amount of excess oxygen does not interfere with the intended operation of the conventional catalyst system.

However, it is desirable to operate the engine at times under lean burn conditions, with excess air, in order to improve fuel economy. Under lean burn conditions, conventional catalytic devices are not very effective for treating the NOx in the resulting oxygen-rich exhaust stream.

The exhaust stream from a diesel engine also has a substantial oxygen content, from perhaps about 2–18% oxygen, and, in addition, contains a significant amount of particulate emissions. The particulate emissions, or soot, are thought to be primarily carbonaceous particles and volatile organic compounds (VOC). It is also believed that other combustion processes result in emissions that are difficult or expensive to control because of, for instance, dilute concentrations of the compounds to be removed from the effluent stream or poor conversion of the compounds using conventional means.

In spite of efforts over the last decade to develop an effective means for reducing NOx to nitrogen under oxidizing conditions in a spark ignition gasoline engine or in a diesel engine, the need for improved conversion effectiveness has remained unsatisfied. Moreover, there is a continuing need for improved effectiveness in treating emissions from any combustion process, particularly for treating the soot particulate emissions from diesel engines.

Particulate filters have been shown to be an effective means of controlling diesel particulate emissions. The principle disadvantage of particulate filters is the need to periodically regenerate the filter to remove the trapped particulate mater. Regeneration removes particulate matter from the filter by oxidizing the carbon and volatile organic compounds (VOCs) to carbon dioxide and water. Thermal regeneration requires exhaust gas temperatures of about 600° C. The regeneration process is exothermic and is very difficult to adequately control to prevent melting or excessive thermal stresses in the filter substrate as the carbon and VOCs burn. An effective method of regeneration at lower temperatures is needed to enable the wide spread use of particulate filters.

An alternative way to treat the hydrocarbon, particulate, or NOx emissions in an exhaust or effluent stream is to destroy such emissions using a non-thermal plasma reactor. Plasma is regarded as the fourth state of matter (ionized state of matter). Unlike thermal plasmas, non-thermal plasmas (NTPs) are in gaseous media at near-ambient temperature and pressure but have electron mean energies considerably higher than other gaseous species in the ambient environment. NTP species include electrically neutral gas molecules, charged particles in the form of positive ions, negative ions, free radicals and electrons, and quanta of electromagnetic radiation (photons). These NTP species are highly reactive. In contrast to thermal processes (such as thermal plasma), an NTP process directs electrical energy to induce favorable gas chemical reactions, rather than using the energy to heat the gas. Therefore, NTP is much more energy-efficient than thermal plasma.

NTPs can be generated by electric discharge in the gas or injection of electrons into the gas by an electron beam. Among the various types of electric discharge reactors, pulse corona and dielectric barrier (silent) discharge reactors are very popular for their effectiveness and efficiency. However, pulse corona reactors have the major disadvantage of requiring special pulsed power supplies to initiate and terminate the pulsed corona. Consequently, dielectric barrier discharge has become a fast growing technology for pollution control.

Cylindrical and planar reactors are two common configurations for dielectric barrier discharge reactors. Both of these configurations are characterized by the presence of one or more insulating layers in a current path between two metal electrodes, in addition to the discharge space. Other dielectric barrier discharge reactors include packed-bed discharge reactors, glow discharge reactors, and surface discharge reactors.

Dielectric barrier discharge NTP reactor designs based upon the use of one or more dielectric ceramic pieces coated with a conductive material arranged to form the dielectric barrier-conductor-dielectric barrier configurations are known. A stacked shape non-thermal plasma reactor and element for use with diesel engines and the like is disclosed in commonly assigned U.S. patent application Ser. No. 09/511,590 filed Feb. 23, 2000 entitled "Design and Method of Manufacturing A Plasma Reactor For Treating Auto Emissions—Stacked Shapes", which is hereby incorporated by reference herein in its entirety. Disclosed therein is a non-thermal plasma reactor prepared from a formed shape of dielectric material used as a building block for creating the region of the non-thermal plasma reactor wherein plasma is generated. The formed shape defines an internal cell in the plasma reactor having an exhaust passage for flowing exhaust gas to be treated there through. A conductive print forming an electrode and connector is disposed on at least one wall of each of the cells, and outer insulative plates, disposed on opposite ends of the multi-cell stack, are provided to protect the conductive print.

Commonly assigned U.S. patent application Ser. No. 09/517,681 filed Mar. 2, 2000 entitled "Plasma Reactor Design for Treating Auto Emissions—Durable and Low Cost," which is hereby incorporated by reference herein in its entirety, discloses a non-thermal plasma reactor element for conversion of exhaust gas constituents. The reactor comprises an element prepared from an extruded indense dielectric material having a plurality of channels separated by substantially planar dielectric barriers.

Commonly assigned U.S. patent application Ser. No. 09/517,879 filed Mar. 2, 2000 entitled "Plasma Reactor For Treating Auto Emissions—Durable And Low Cost—Curved Shapes," which is hereby incorporated by reference herein in its entirety, and commonly assigned U.S. patent application Ser. No. 09/517,682 filed Mar. 2, 2000 entitled "Method Of Manufacture Of a Plasma Reactor With Curved Shape For Treating Auto Emissions," which is also incorporated by reference herein in its entirety, disclose a double dielectric barrier reactor and method for preparing same, respectively. The reactor is characterized by a reactor element prepared from a curved, swept-shaped substrate specifically designed for fabrication via extrusion.

Commonly assigned U.S. patent application Ser. No. 09/741,781 filed Dec. 19, 2000 entitled "Single Dielectric Barrier Non-Thermal Plasma Reactor And Method—Planar And Swept Shapes," which is hereby incorporated by reference herein in its entirety, discloses single dielectric barrier e tided substrate non-thermal plasma reactors having a plurality of single dielectric barriers defining exhaust channels between pairs of the single dielectric barriers. The extruded reactor element includes cells defined by a single structural dielectric barrier comprising a "conductor-single structural dielectric barrier-exhaust channel-conductor" arrangement, wherein individual cells of the reactor element are defined by a single structural dielectric barrier rather than a double dielectric barrier. The reactors include extruded substrates having various shape configurations including parallel plates, parallel plates having discrete spacers, C-shaped plates, I-shaped plates, and swept-shaped reactor substrates, such as round, oval, etc., shapes.

Commonly assigned U.S. patent application Ser. No. 09/741,764 filed Dec. 19, 2000 entitled "Non-Thermal Plasma Reactor Design And Method—Single Structural Dielectric Barrier," which is hereby incorporated by reference herein in its entirety, discloses a non-thermal plasma reactor and method comprising a single structural dielectric barrier. The reactor element includes cells defined by a single structural dielectric barrier comprising a "conductor-single structural dielectric barrier-exhaust passage-conductor" arrangement, wherein individual cells of the reactor element are defined by a single structural dielectric barrier rather than a double dielectric barrier. The single structural dielectric barrier non-thermal plasma reactors include cells having various configurations including planar, cylindrical, and swept shapes such as plates, half-box shapes, C-shapes, and tubes.

Commonly assignee U.S. patent application Ser. No. 09/40,572 filed Dec. 18, 2000 entitled "Scaleable Inter-Digitized Tine Non-Thermal Plasma Reactor," which is hereby incorporated by reference herein in its entirety, discloses a scaleable inter-digitized tine non-thermal plasma reactor element having pairs of inter-digitized tine end connectors connected together and defining gas passages between the tines with alternate ground and charge carrying electrodes provided on the tines. The inter-digitized tine reactor element has a scaleable height, width, and length.

Difficulties in the practical use of dielectric barrier discharge reactors include an expensive power supply, a low energy efficiency and flow rate, and the blocking of discharge volume by dusts in the feed gas and or solid mineral compounds produced during the plasma reactions. Power control to the NTP reactor is typically accomplished by varying a combination of voltage and frequency in response to varying engine conditions such as exhaust flow and constituent level. The size, cost and impact on fuel economy of providing such high power loads renders non-thermal plasma reactors non-feasible commercially for transportation applications. For example, currently available non-thermal plasma (NTP) reactors having stacked plate configurations require a high level of power (approximately 2 kW) to effectively treat the quantity of combustion exhaust gas produced from 2-liter diesel engines. Further, particulate and fuel deposits are known to collect on the NTP reactor plates, greatly diminishing reactor efficiency after a short period of operation. This contamination of the surface results in excess power consumption and poor electrochemical performance. Increasing the space velocity of the reactor has been shown to eliminate this problem on smaller scale reactors. However, pulsed flow and wide dynamic flow ranges of the "full scale" unit results in a reactor that is too small for high flow conditions causing excess back pressure and robbing the engine of fuel economy if it is sized small enough to keep "clean" during extended idles.

What is needed in the art is an improved NTP reactor and method providing effective and economically efficient treatment of combustion exhaust streams.

SUMMARY INVENTION

The present invention comprises a non-thermal plasma reactor and method providing optimal voltage and frequency for transfer through the power supply while varying the active corona volume. In one embodiment, variable corona volumes are achieved with a non-thermal plasma reactor employing one or more segmented reactor plates, each segmented reactor plate having a plurality of selectively energizable electrodes, to best enable overall plasma volume variation and greatest span of possible volumes. Most preferably, the selectively energizable electrodes are progressively smaller in size along the exhaust flow direction. A reactor in accordance with this embodiment comprises, for example, a first electrode providing a first volume, a second electrode providing a second volume that is half the size of the first volume, and a third electrode having a third volume that is half the size of the second volume. During system operation, power is applied to selectively energize conductors in individual electrodes to control the active corona volume as desired in accordance with the quantity and nature of the particular exhaust stream being treated. For example, the smallest electrode volume segments disposed nearest the exhaust outlet end are energized first and electrode segments in the central and exhaust inlet areas are energized progressively, in turn, in response to increasing exhaust flow. In alternate embodiments, the segmented reactor elements include any suitable element configuration, including C-shaped, I-shaped, planar, swept-shaped, or inter-digitized devices prepared from comb-shaped reactor elements.

An optimized high space velocity in the active corona volume is maintained by selectively applying power to an individual reactor segment and applying power to additional reactor segments only as needed for efficient treatment of the exhaust stream thereby minimizing power consumption. For example, additional reactor segments may be energized during periods of high exhaust flows.

In order to accommodate idle conditions while fully treating high flow conditions, the present invention provides a non-thermal plasma reactor wherein the electrode pattern is segmented. This allows for only a small segment to operate during idle while all segments are energized during periods of high exhaust flow. In a preferred embodiment, a combination of ground connected segmented electrodes and non-segmented high voltage electrodes are provided thereby providing simplified switching for selectively activating the individually energizable ground electrode segments to effect variable corona volumes for treating the exhaust stream. This embodiment comprises a non-thermal plasma reactor exhaust treatment system and method for a combustion process comprising a housing having a fluid inlet for admitting an exhaust stream to be treated and a fluid outlet for discharging a treated stream. At least one non-thermal plasma element having a plurality of alternating ground connected segmented electrode plates having differentially sized individually energizable electrode segments defining a plurality of corona volumes and non-segmented high voltage electrode plates disposed in the housing. During system operation, the individually energizable electrode segments of the ground connected segmented electrode plates are selectively activated to effect variable corona volumes for treating said exhaust stream. Advantageously, this embodiment enables use of less expensive low voltage switches for individually energizing the ground electrode segments.

The method of this embodiment comprises admitting an exhaust stream into a non-thermal plasma reactor comprising a housing having a fluid inlet for admitting a flow of exhaust, a fluid outlet for discharging a treated stream, and at least one segmented non-thermal plasma element disposed therein; the segmented element comprising a plurality of alternating ground connected segmented electrode plates having differentially sized individually energizable electrode segments defining a plurality of corona volumes and non-segmented high voltage electrode plates; and selectively activating the individually energizable electrode segments to effect variable corona volumes for treating the exhaust stream.

The present reactors are particularly suitable for pretreating gases to effect NOx to $N_2$ conversion across a specialized catalyst. The reactors are particularly suitable for pretreating oxygen rich exhaust gas (such as lean burn exhaust) upstream of a catalytic converter by reacting NO to nitrogen compounds (principally $NO_2$) more easily reduced across a specialized catalyst in a catalytic converter. The present reactors are also particularly suitable for cleaning and regenerating a down stream diesel particulate filter. The present reactors are particularly suitable for cleaning and regenerating a down stream diesel particulate filter at far lower exhaust gas temperatures than are required by untreated exhaust gases. NO is oxidized in the plasma forming nitrogen compounds (principally $NO_2$) which oxidize the carbon particles and VOC trapped by the filter. Advantageously, particulate filter regeneration is observed at exhaust gas temperatures of about 250° C. and greater.

The present NTP reactor provides increased longevity, improved performance, less capacitive load to the power supply, reduced exhaust back pressure, and better fuel economy than previous reactors. Advantageously, the present system and method for maintaining high space velocity in the active corona volume minimizes deposition of particulate matter and fuel on the NTP reactor surfaces which can inhibit reactor performance over time. Advantageously, the present NTP reactor provides reduced power consumption by at least about 40% over previously available reactors, without further system optimization.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting.

DESCRIPTION OF THE PREFERRED EMBODIMENT

Figure 1:
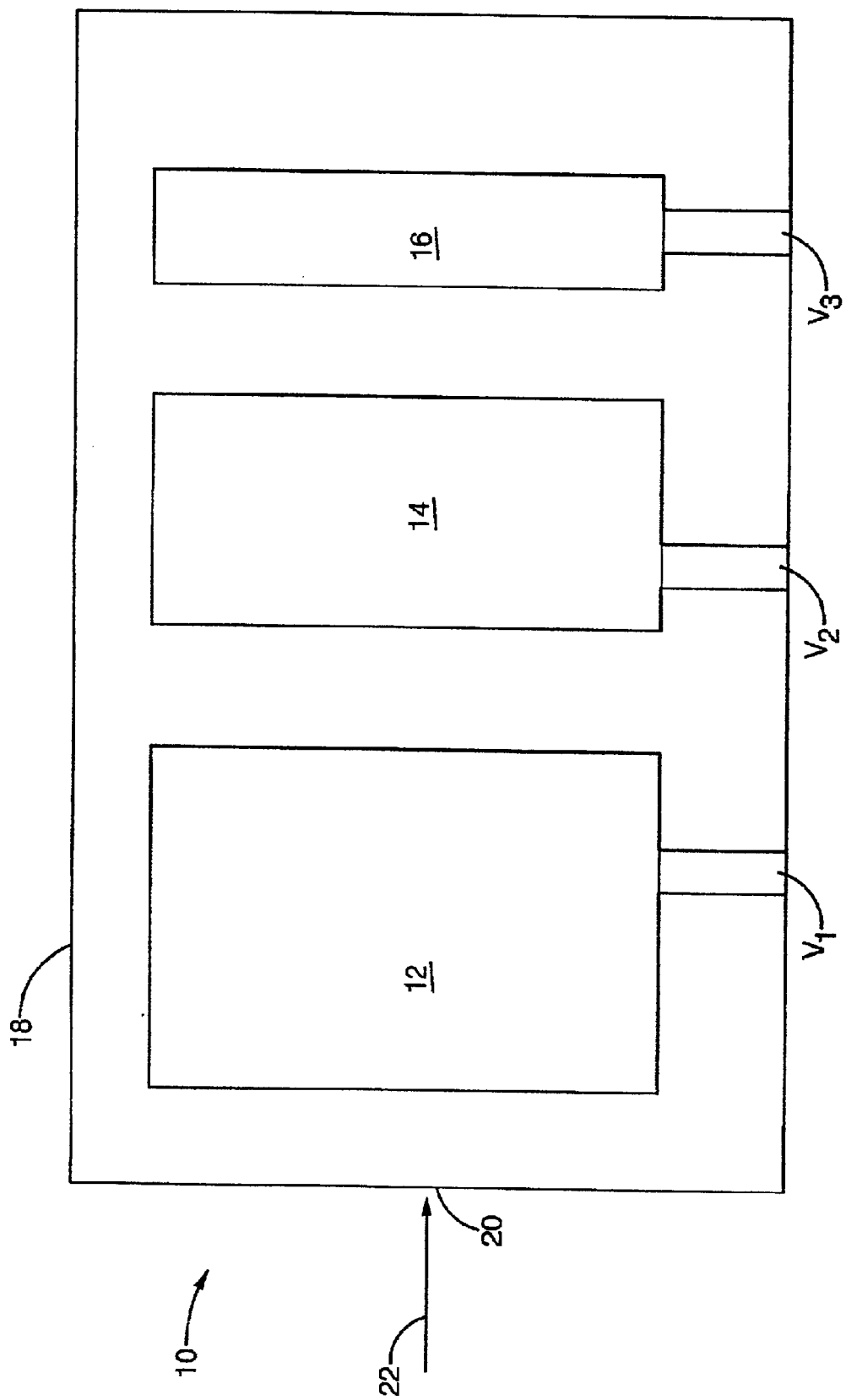
FIG. 1 provides a schematic representation of a NTP reactor having segmented reactor plates comprising selectively energizable electrodes in accordance with the present invention.

FIG. 1 is a schematic view of a segmented parallel plate reactor element 10 having selectively energizable electrodes 12, 14, 16 for generating a non-thermal plasma in accordance with one possible embodiment of the present intention. This embodiment provides differential sizing for electrodes 12, 14, 16, electrode 12 having a first size for generating a corona volume $V_1$, electrode 14 having a second size that is about half the size of electrode 12 for generating a corona volume $V_2$, and electrode 16 having a third size that is about half the size of electrode 14 for generating a corona volume $V_3$. The non-thermal plasma reactor 10 stack comprising a plurality of plates 11 is disposed in a housing 18 having a fluid inlet 20 for ingress of fluid such as a diesel engine exhaust stream 22 and a fluid outlet (not shown in FIG. 1) for discharging the treated exhaust stream.

Figure 2:
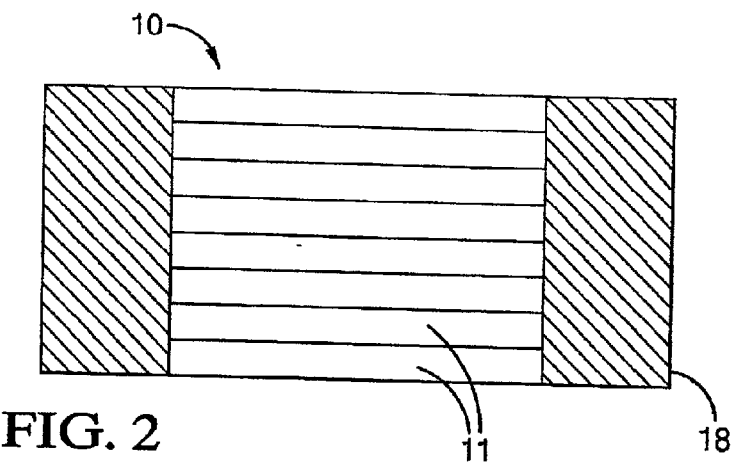
FIG. 2 provides a front inlet view of a parallel plate reactor stack prepared with a plurality of segmented reactor plates in accordance with the present invention.

FIG. 2 shows a front inlet view of the reactor 10 having a plurality of alternating power and ground electrode coated plates 11, each plate 11 including a plurality of selectively energizable electrodes 12, 14, 16 having progressively smaller corona volumes $V_1$, $V_2$, and $V_3$, respectively.

The plurality of electrodes each preferably includes differential sizing to enable optimum plasma volume variation, the quantity being determined by the requirements of the fluid being treated. Individual NTP electrodes 12, 14, 16 comprise a conductor formed from, for example, stainless steel, embedded between two opposing layers of dielectric material to form the reactor element. The dielectric layers may comprise glass, quartz, ceramic, Teflon, or epoxy, for example. Conductors are connected to power and ground so that adjacent electrodes have opposite polarity. The present non-thermal plasma reactors are highly adaptable and may have elements provided in a variety of configurations, including C-shaped, I-shaped, planar, swept-shaped, or inter-digitized devices prepared from comb-shaped reactor elements.

The separation between adjacent electrodes defines individual reaction volumes or discharge volumes, through which the passing fluid stream 22 is treated. In prior NTP reactor designs, the adjacent electrodes are connected together in series so that the entire system is either turned on (fully powered) or off. By selectively applying power to an individual reactor segment (such as electrode 16) and applying power to additional reactor segments (e.g., electrodes 14 and 12) only as needed for efficient treatment of the exhaust stream 22, an optimized high space velocity in the active corona volume $V_3$ or volumes $V_2$, $V_1$, is maintained. For example, additional conductors in electrodes 14 and 12 may be energized during periods of high exhaust flows.

Figure 3:
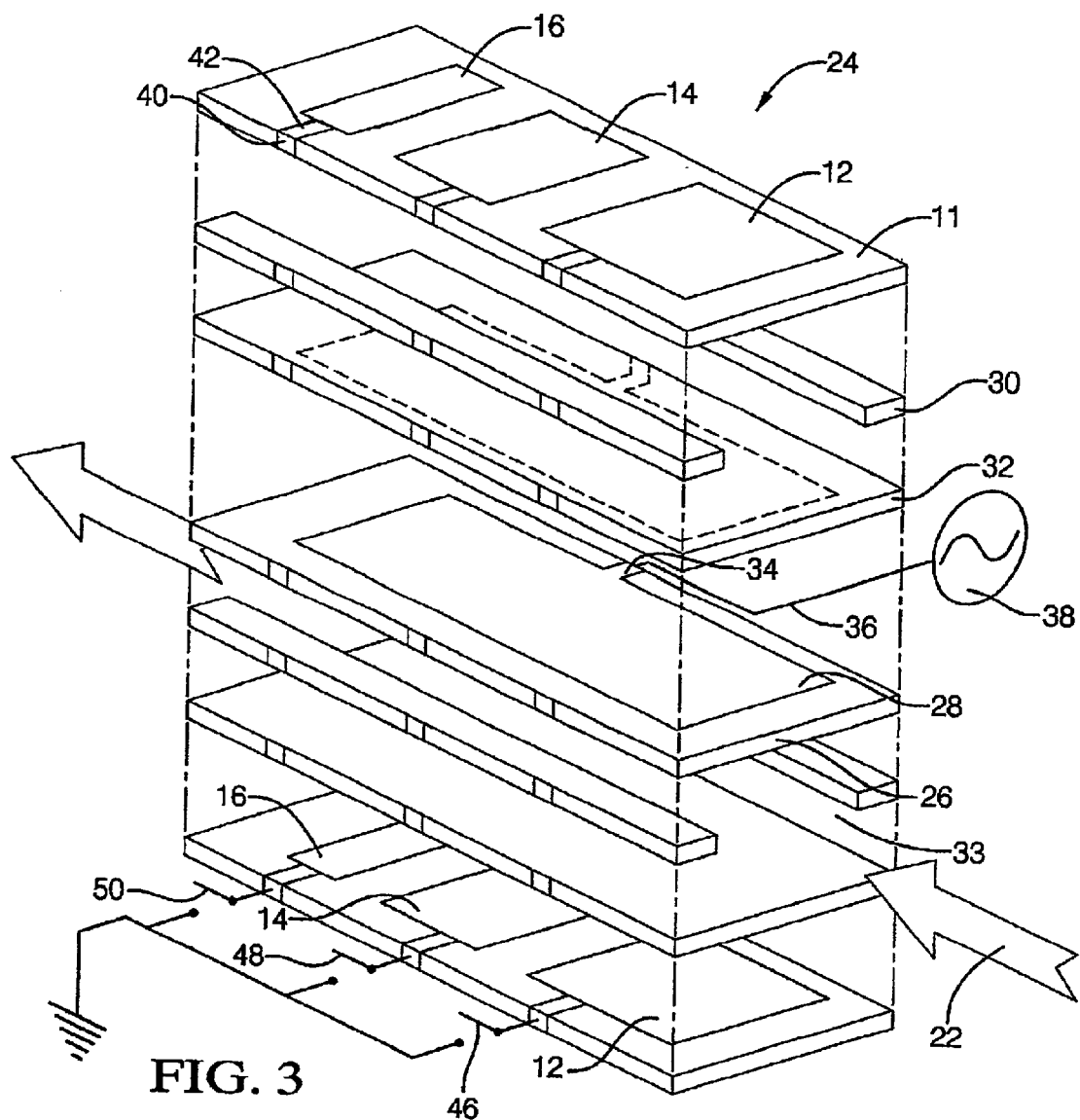
FIG. 3 provides a partially exploded front inlet view of a portion of a parallel plate reactor stack prepared with a combination of segmented and non-segmented electrode plates in accordance with another embodiment of the present invention.

FIG. 3 shows a portion of a parallel plate reactor element 24 having a combination of segmented electrode plates 11 having selectively energizable electrodes 12, 14, 16 and non-segmented electrode plates 26 having high voltage electrode 28. Preferably, the differentially sized electrode segments 12, 14, 16 comprise progressively smaller electrode segments. In one embodiment, electrode segment 12 comprises a first size for generating a corona volume $V_1$, electrode segment 14 comprises a second size that is about half the size of electrode segment 12 for generating a corona volume $V_2$, and electrode segment 16 comprises a third size that is about half the size of electrode segment 14 for generating a corona volume $V_3$. One non-segmented electrode plate 26 is shown in FIG. 3; a full-scale reactor would comprise a plurality of segmented electrode plates 11 and non-segmented electrode plates 26 in accordance with the needs of the particular exhaust system. As with parallel plate non-thermal plasma reactors generally, spacers 30 and dielectric plates 32 are stacked between alternating ground and high voltage electrode plates to define the passage 33 wherein the exhaust stream 22 is treated. In the invention of FIG. 3, the segmented ground electrode plates 11 and non-segmented high voltage electrode plates 26 acre arranged in alternating fashion with non-segmented high voltage electrode plates 26 connected by connectors 34 and power connection path 36 to a high voltage source 38. Segmented electrode plates 11 are connected by connectors 42 and ground connection path 40 to ground. Switches 46, 48, 50 individually energize electrode segments 12, 14, 16 of ground electrode plates 11 to effect variable corona volumes as needed. Optimized high space velocity in the active corona volume is maintained by selectively activating an individual ground connected electrode. segment. Additional ground connected electrode segments are activated as needed for efficient treatment of the exhaust stream. For example, a first individual ground connected electrode segment is activated with additional ground connected electrode segments activated during periods of high exhaust flows.

The present non-thermal plasma reactor exhaust treatment system is particularly suitable for pretreating an exhaust stream such as an oxygen rich (lean burn) exhaust gas to enhance NOx to $N_2$ conversion by reacting NO to nitrogen compounds (primarily $NO_2$) more easily reduced across a specialized catalyst.

In addition, the present system and method is suitable for use as a down stream regeneration system for a diesel particulate filter. The present system and method is particularly suitable for cleaning and regenerating a down stream diesel particulate filter through the formation of nitrogen compounds (principally $NO_2$) which are effective in oxidizing trapped particulate matter in the filter at lower exhaust gas temperatures (250° C. and greater) than previous regeneration methods.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A dielectric barrier discharge non-thermal plasma reactor exhaust treatment system for a combustion process comprising:

a housing having a fluid inlet for admitting an exhaust stream to be treated and a fluid outlet for discharging a treated stream;

at least one segmented dielectric barrier discharge non-thermal plasma element disposed in said housing, said element comprising a plurality of segments having differentially sized individually energizable electrodes defining a plurality of corona volumes;

wherein during system operation, said individually energizable electrodes are selectively activated to effect variable corona volumes for treating said exhaust stream.

2. The system of claim 1, wherein optimized high space velocity in the active corona volume is maintained by selectively activating an individual reactor segment and activating additional reactor segments only as needed for efficient treatment of the exhaust stream.

3. The system of claim 1, wherein additional reactor segments are activated during periods of high exhaust flows.

4. The system of claim 1, wherein said segmented elements comprise C-shaped elements, I-shaped elements, planar elements, swept-shaped elements, comb-shaped elements, or a combination thereof.

5. The system of claim 1, wherein said differentially sized electrodes comprise progressively smaller electrodes.

6. The system of claim 1, wherein said system comprises a pretreatment system.

7. The system of claim 1, wherein said system comprises a down stream regeneration system for a diesel particulate filter.

8. A segmented element for a dielectric barrier discharge non-thermal plasma reactor comprising:
- a plurality of segments having differentially sized individually energizable electrodes defining a plurality of corona volumes;
- wherein during dielectric barrier discharge non-thermal plasma reactor operation, said individually energizable electrodes are selectively activated to effect variable corona volumes for treating said exhaust stream; and further
- wherein additional segments are activated during periods of high exhaust flows.

9. The segmented element of claim 8, wherein optimized high space velocity in the active corona volume is maintained by selectively activating an individual segment and activating additional segments only as needed for efficient treatment of the exhaust stream.

10. The segmented element of claim 8, wherein said segmented elements comprise C-shaped elements, I-shaped elements, planar elements, swept-shaped elements, inter-digitized elements prepared from comb-shaped elements, or a combination thereof.

11. The segmented element of claim 8, wherein said differentially sized electrodes comprise progressively smaller electrodes.

12. A method for treating a combustion exhaust stream comprising:
- admitting an exhaust stream into a dielectric barrier discharge non-thermal plasma reactor comprising: a housing having a fluid inlet for admitting said exhaust stream and a fluid outlet for discharging a treated stream; at least one differentially sized segmented dielectric barrier discharge non-thermal plasma element disposed in said housing, said element comprising a plurality of segments having individually energizable electrodes defining a plurality of corona volumes;
- selectively activating said individually energizable electrodes to effect variable corona volumes for treating said exhaust stream.

13. The method of claim 12, further comprising:
- selectively activating an individual reactor segment and activating additional reactor segments only as needed for efficient treatment of the exhaust stream so as to maintain optimized high space velocity in the active corona volume.

14. The method of claim 12, further comprising:
- activating additional reactor segments during periods of high exhaust flows.

15. The method of claim 12, wherein said segmented elements comprise C-shaped elements, I-shaped elements, planar elements, swept-shaped elements, inter-digitized elements prepared from comb-shaped elements, or a combination thereof.

16. The method of claim 12, wherein said differentially sized electrodes comprise progressively smaller electrodes.

17. The method of claim 12, wherein said method comprises a pretreatment method.

18. The method of claim 12, wherein said method comprises a down stream regeneration method for a diesel particulate filter.

19. A dielectric barrier discharge non-thermal plasma reactor exhaust treatment system for a combustion process comprising:
- a housing having a fluid inlet for admitting an exhaust stream to be treated and a fluid outlet for discharging a treated stream;
- at least one dielectric barrier discharge non-thermal plasma element disposed in said housing, said element comprising a plurality of alternating ground connected segmented electrode plates and non-segmented high voltage electrode plates;
- said ground connected segmented electrode plates having differentially sized individually energizable electrode segments defining a plurality of corona volumes;
- wherein during system operation, said individually energizable electrode segments of said ground connected segmented electrode plates are selectively activated to effect variable corona volumes for treating said exhaust stream.

20. The system of claim 19, wherein optimized high space velocity in the active corona volume is maintained by selectively activating an individual ground connected electrode segment and activating additional ground connected electrode segments only as needed for efficient treatment of the exhaust stream.

21. The system of claim 19, wherein additional ground electrode segments are activated during periods of high exhaust flows.

22. The system of claim 19, wherein said differentially sized electrode segments comprise progressively smaller electrode segments.

23. The system of claim 19, wherein said system comprises a pretreatment system for reacting NO in an oxygen rich exhaust stream to nitrogen compounds more easily reduced across a specialized catalyst.

24. The system of claim 19, wherein said system comprises a low exhaust gas temperature down stream regeneration system for a diesel particulate filter.

25. The system of claim 19, wherein said segmented elements comprise C-shaped elements, I-shaped elements, planar elements, swept-shaped elements, inter-digitized comb-shaped elements, or a combination thereof.

26. A segmented element for a dielectric barrier discharge non-thermal plasma reactor comprising:
- a plurality of ground connected segmented dielectric barrier discharge electrode plates, said segmented ground connected electrode plates having a plurality of differentially sized individually energizable electrode segments defining a plurality of corona volumes;
- a plurality of non-segmented high voltage electrode plates arranged in alternating arrangement with said segmented ground connected electrode plates;
- wherein during operation, said individually energizable electrode segments are selectively activated to effect variable corona volumes for treating an exhaust stream; and further
- wherein additional electrode segments are activated during periods of high exhaust flows.

27. The segmented element of claim 26, wherein optimized high space velocity in the active corona volume is maintained by selectively activating an individual electrode segment and activating additional segments only as needed for efficient treatment of the exhaust stream.

28. The segmented element of claim 26, wherein said differentially sized electrode segments comprise progressively smaller electrode segments.

29. The segmented element of claim 26, wherein said segmented element comprises C-shaped elements, I-shaped elements, planar elements, swept-shaped elements, interdigitized comb-shaped elements, or a combination thereof.

30. A method for treating a combustion exhaust stream comprising:

admitting an exhaust stream into a dielectric barrier discharge non-thermal plasma reactor comprising a housing having a fluid inlet for admitting said flow of exhaust and a fluid outlet for discharging a treated stream; at least one segmented dielectric barrier discharge non-thermal plasma element disposed in said housing;

said element comprising a plurality of alternating ground connected segmented electrode plates and non-segmented high voltage electrode plates;

said ground connected segmented electrode plates having differentially sized individually energizable electrode segments defining a plurality of corona volumes; and selectively activating said individually energizable electrode segments to effect variable corona volumes for treating said exhaust stream.

31. The method of claim 30, further comprising:

selectively activating an individual electrode segment and activating additional electrode segments only as needed for efficient treatment of the exhaust stream so as to maintain optimized high space velocity in the active corona volume.

32. The method of claim 30, further comprising:

activating additional electrode segments during periods of high exhaust flows.

33. The method of claim 30, wherein said differentially sized electrode segments comprise progressively smaller electrode segments.

34. The method of claim 30, wherein said method comprises a pretreatment method for reacting NO in an oxygen rich exhaust stream to nitrogen compounds more easily reduced across a specialized catalyst.

35. The method of claim 30, wherein said method comprises a low exhaust gas temperature down stream regeneration method for a diesel particulate filter.

* * * * *